(12) United States Patent
Jabaji

(10) Patent No.: US 6,452,363 B1
(45) Date of Patent: Sep. 17, 2002

(54) MULTIPLE BATTERY CHARGE EQUALIZER

(75) Inventor: Issam Jabaji, Morton Grove, IL (US)

(73) Assignee: C. E. Niehoff & Co., Evanston, IL (US)

( * ) Notice: Subject to any disclaimer, the term of this patent is extended or adjusted under 35 U.S.C. 154(b) by 0 days.

(21) Appl. No.: 09/750,806

(22) Filed: Dec. 28, 2000

(51) Int. Cl.$^7$ .............................................. H01M 10/44
(52) U.S. Cl. ...................................................... 320/122
(58) Field of Search ................................. 320/116, 117, 320/118, 120, 122

(56) References Cited

U.S. PATENT DOCUMENTS

| | | |
|---|---|---|
| 3,237,078 A | 2/1966 | Mallory |
| 4,238,721 A | 12/1980 | DeLuca et al. |
| 4,242,627 A | 12/1980 | Kisiel |
| 4,303,877 A | 12/1981 | Meinhold |
| 5,479,083 A | 12/1995 | Brainard |
| 5,504,415 A | 4/1996 | Podrzhansky et al. |
| 5,710,504 A | 1/1998 | Pascual et al. |
| 5,821,733 A | 10/1998 | Turnbull |
| 5,905,360 A | 5/1999 | Ukita |
| 5,932,932 A | 8/1999 | Agatsuma et al. |
| 5,956,241 A | 9/1999 | LoCascio |
| 5,982,050 A | 11/1999 | Matsui |
| 5,982,144 A | 11/1999 | Johnson et al. |
| 6,008,623 A | 12/1999 | Chen et al. |
| 6,046,573 A | 4/2000 | Wikström |
| 6,064,178 A | 5/2000 | Miller |
| 6,104,164 A | 8/2000 | Iino et al. |
| 6,114,835 A | 9/2000 | Price |
| 6,121,751 A | 9/2000 | Merritt |
| 6,140,800 A | 10/2000 | Peterson |

Primary Examiner—Edward H. Tso
(74) Attorney, Agent, or Firm—Brinks Hofer Gilson & Lione

(57) ABSTRACT

A charge equalizer for a string of series-connected batteries includes a shunt path for each of the batteries. The equalizer measures the voltage of each of the batteries of the string and then closes a switch in the shunt path associated with the highest voltage battery for a predetermined time. Then the switches of all of the shunt paths are opened and the cycle repeats. In this way, charging is equalized in the batteries of the string, regardless of whether or not any of the batteries of the string is in an over charged condition.

9 Claims, 5 Drawing Sheets

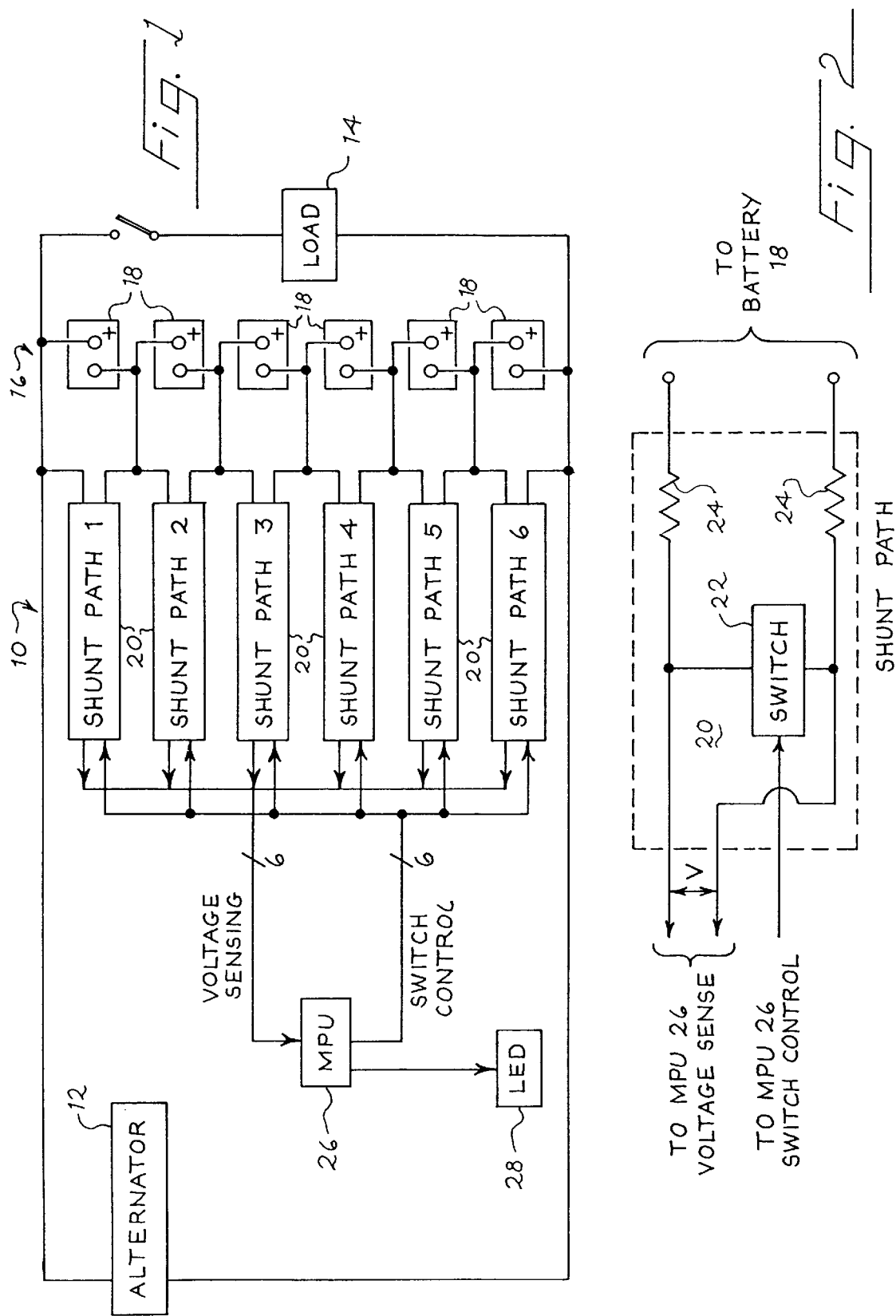

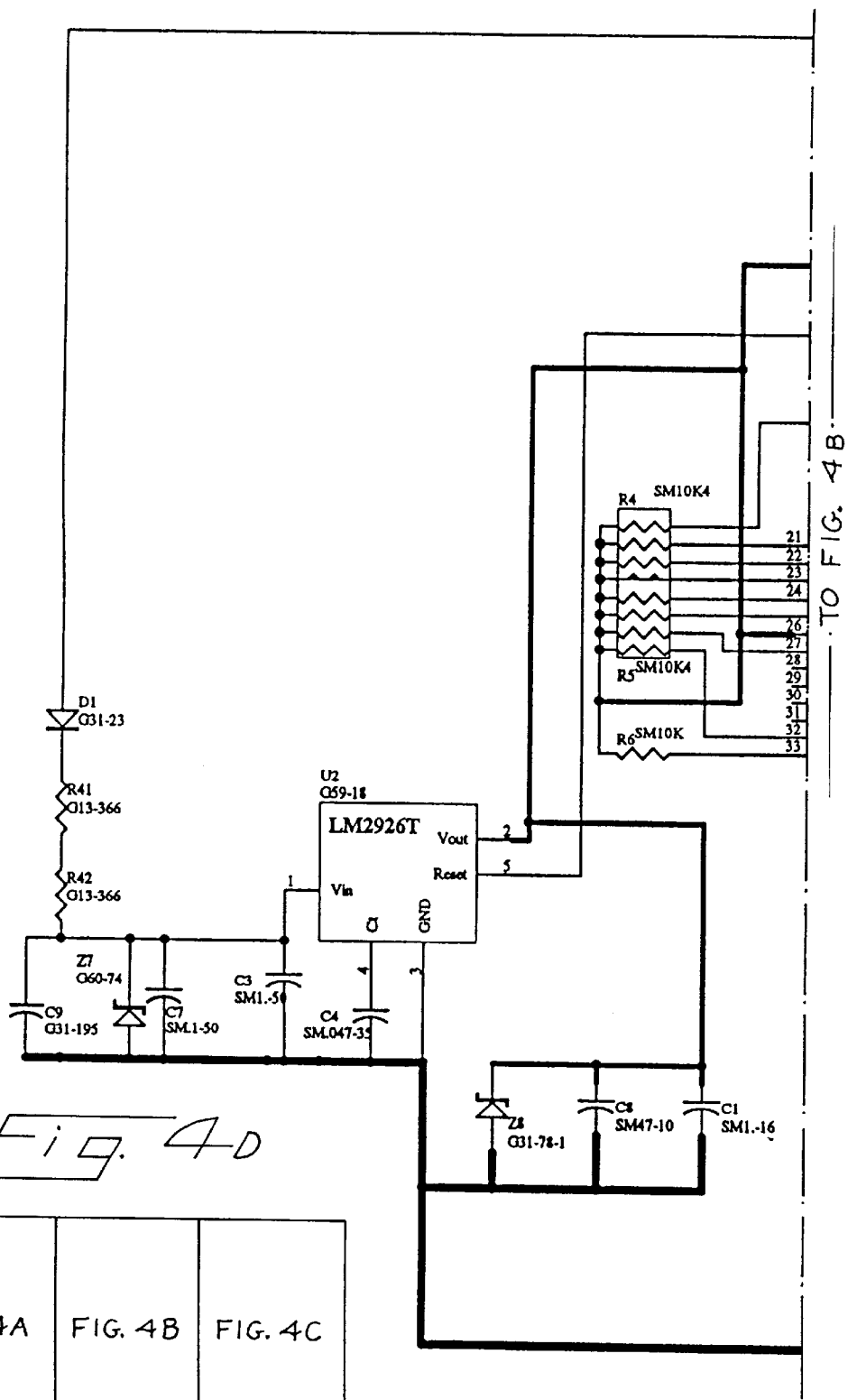

MULTIPLE BATTERY CHARGE EQUALIZER

REFERENCE TO MICROFICHE APPENDIX

This specification includes an Appendix A, which includes a listing of a computer program included in the preferred embodiment described below. Appendix A is provided on a compact disc containing the file Code2.txt (16 Kilobytes, created Jun. 13, 2002), which file is hereby incorporated by reference. This appendix includes copyrighted subject matter, and the assignee of the present invention retains all copyright rights, other than the right to reproduce the appendix as a portion of the specification.

BACKGROUND

This invention relates to methods and systems for equalizing charge on a set of series-connected batteries as the batteries are being charged.

Many automotive electrical systems require a higher operating voltage than that available from the conventional 12.6 V battery. This is because automotive electrical power needs have increased significantly over the past decade, and it is more efficient to supply high power by using a higher voltage rather than by simply increasing the amperage. Operation of such systems requires diligent monitoring and control of the individual battery voltages in order to maintain equal charging of the batteries.

When a vehicle engine starts, the alternator produces a regulated voltage across the battery terminals for charging. Typically, an alternator output voltage of 14.0 V is used to charge a 12.6 V battery. Series-connected batteries generally provide 14.0 V charge increments for each battery in the series. For example, when six batteries are connected in series, the alternator is designed to produce an 84 V charging voltage across the entire string.

Under normal operating conditions, battery charge characteristics vary depending upon many factors, including the following:

1. Age of battery: older batteries accept more current then newer batteries;
2. State of charge: the charge current varies with time during the charging process;
3. Ambient temperature: batteries accept less charge as temperature drops;
4. Battery construction: details of battery design affect charging characteristics.

Variations between individual batteries within a single string will often cause overcharging or under charging in one or more of the batteries of the string. Any battery in the series-connected string that once attains an overcharged state tends to persist in that state during charging until battery failure occurs.

Chen U.S. Pat. No. 6,008,623 and Podrazhansky U.S. Pat. No. 5,504,415 both disclose charge equalizers for a series-connected battery string. The Chen system activates flyback converters to draw out the overcharging currents of the batteries in the string. Overcharging currents are detected by comparing the voltage across a battery or cell against a fixed reference. The Podrazhansky system measures the voltage across a battery to determine the state of charge of the battery. A circuit that selectively shunts charging current around the battery is provided, and, depending upon the state of charge of each battery, a portion of the charging current may be shunted around the battery to prevent overcharging.

The systems described above suffer from the disadvantage that the charging currents applied to individual batteries are only limited after the battery voltage has exceeded a preselected threshold voltage. For this reason, these systems do not equalize the rate of charging of individual batteries prior to the time any individual one of the batteries reaches the threshold voltage.

BRIEF SUMMARY

The charging systems described below provide a shunt path for each of a set of series-connected batteries. Each shunt path includes a respective switch and at least one respective load. On a repeating basis, all of the switches are placed in the open-circuit condition, and then the voltage across each of the batteries is measured. The largest measured voltage is determined, and then the switch of the shunt path associated with the largest measured voltage is closed for a predetermined time. At this point the cycle repeats, all of the switches are opened, and the battery voltages are again measured.

The disclosed system reduces charging current applied to the highest-voltage battery, whether or not the highest-voltage battery is in an over charged condition. The undercharged batteries therefore receive relatively more charging current than the batteries at a higher charge state. In this way, the state of charge of the individual batteries is maintained more nearly equal throughout the period that the batteries are being charged to a full state of charge.

This section has been provided by way of general introduction, and it should not be used to narrow the scope of the following claims.

BRIEF DESCRIPTION OF THE DRAWINGS

FIG. 1 is a block diagram of a battery charging system that includes a preferred embodiment of the charge equalizer of this invention.

FIG. 2 is a more detailed view of one of the shunt paths of FIG. 1.

FIGS. 4A–4D are a schematic diagram useful in applying the listing of Appendix A.

DETAILED DESCRIPTION OF THE PRESENTLY PREFERRED EMBODIMENTS

Figure 3:
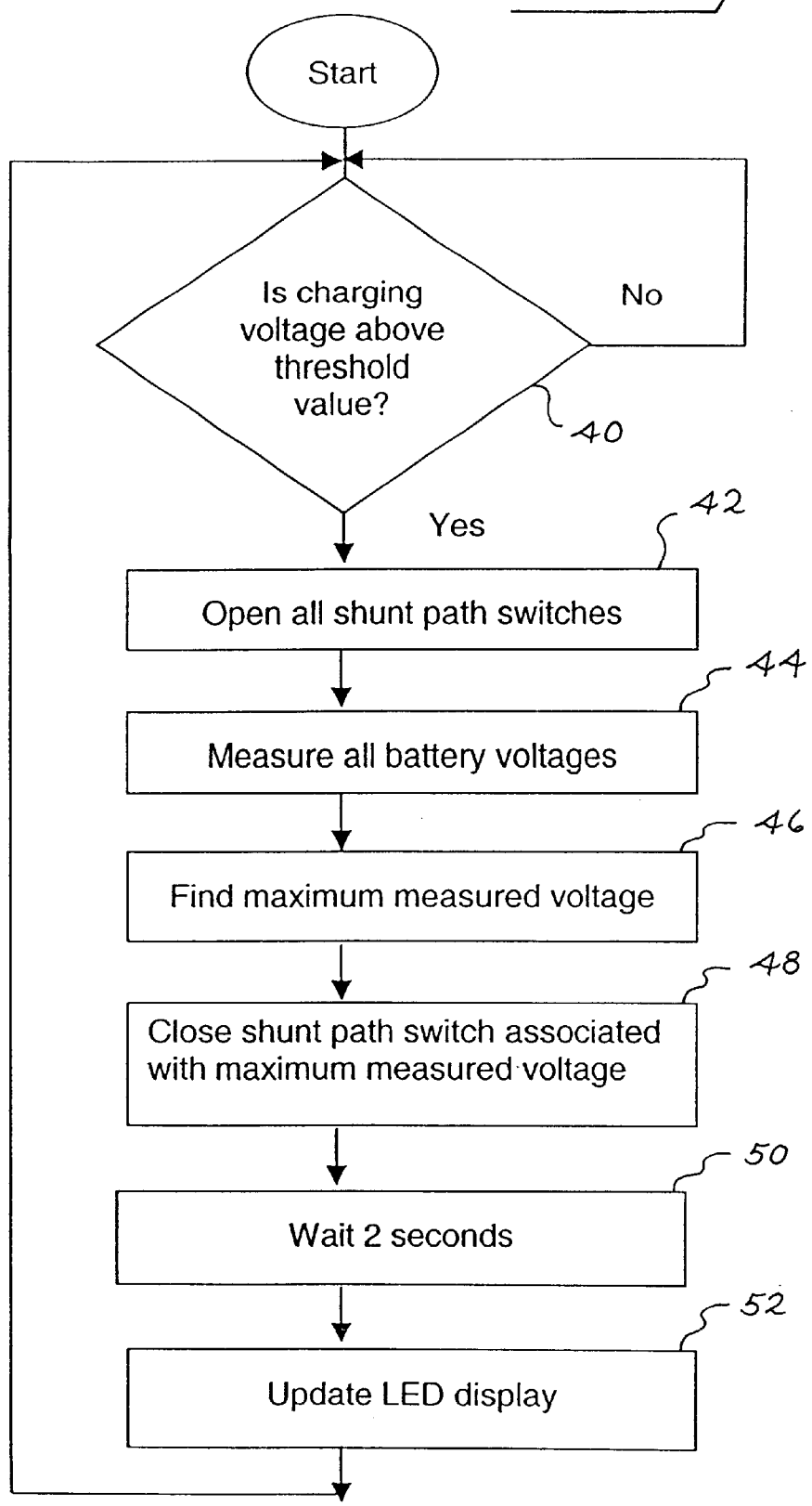
FIG. 3 is a block diagram of a method performed by the system of FIG. 1.
Figure 4B:
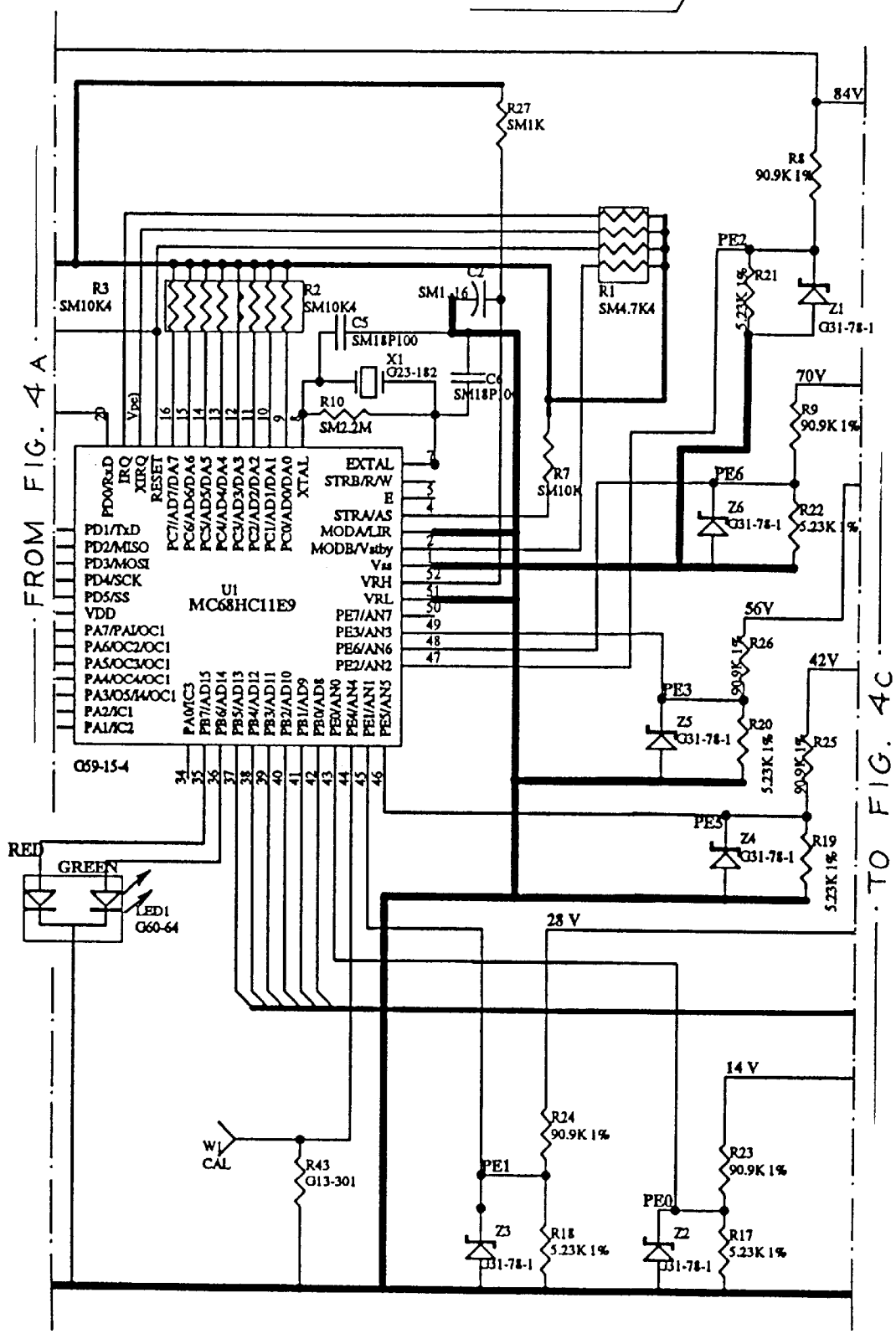
Figure 4C:
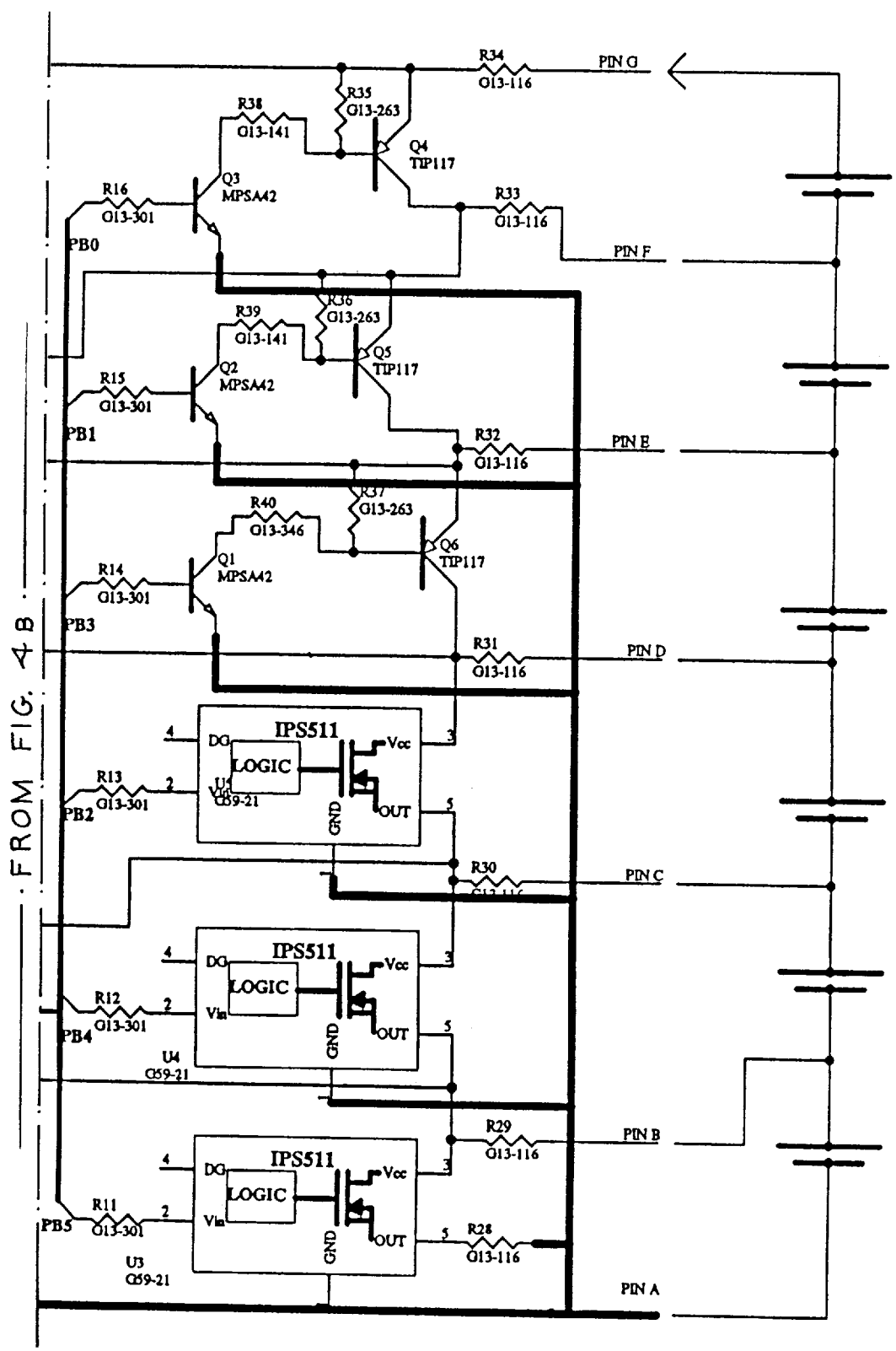

Turning out the drawings, FIG. 1 shows a block diagram of a charging system that incorporates a preferred embodiment of this invention. The charging system 10 includes an alternator 12 that supplies a regulated voltage to a load 14 and to a string 16 of series-connected batteries 18.

The elements 12 through 18 are conventional, and can take any suitable form. The term "alternator" is intended broadly to encompass any suitable voltage-generating device, including generators and various types of alternators. The load 14 can be any electrical load, such as for example the electrical loads included in an automotive vehicle. The batteries 18 also can take any desired form, and each battery 18 may represent a single cell of a multiple-cell battery, or alternately each battery 18 may represent a physically separate battery. By way of example, the batteries 18 may be lead-acid batteries, though any other rechargeable battery may be substituted.

In this example, each of the batteries 18 is a 12-volt battery, and there are six of the batteries 18 in the series-connected string 16. In this example, the alternator 12 produces a charging voltage of 84 volts.

As shown in FIG. 1, a shunt path 20 is provided for each of the batteries 18, and each shunt path 20 is connected across the terminals of the respective battery 18. FIG. 2 provides a more detailed block diagram of one of the shunt paths 20, which in this example are all identical.

As shown in FIG. 2, each shunt path 20 includes a switch 22 that can be placed in either an open-circuit condition or a closed-circuit condition. Each shunt path 20 also includes at least one electrical load, in this example a pair of resistors 24. Each shunt path 20 has one control input by which a microprocessor 26 (FIG. 1) opens or closes the switch 22. In addition, each of the shunt paths 20 includes a voltage sensing output that is coupled to the microprocessor 26 to allow the microprocessor 26 to measure the voltage across the battery 18 when the switch 22 is in the open-circuit condition.

The switch 22 can operate as an on/off switch or as a progressively controlled, modulating switch that reduces shunt current without stopping it completely. The switch can be implemented as a semiconductor switch (such as a suitable transistor) or as an electromechanical switch (such as a relay). The electrical loads 24 may vary in number such that a single shunt path can use one, two, three, or more electrical loads. The electrical loads are shown by way of example as resistors 24, but they can take any suitable form that stores or dissipates energy, such as capacitors or light bulbs.

Returning to FIG. 1, the microprocessor 26 generates switch control signals for each of the shunt paths 20, and the microprocessor 26 receives the voltage sensing signals from each of the shunt paths 20. As explained below in conjunction with FIG. 3, the microprocessor 26 measures the battery voltages and uses the measured voltages to control the switches. Information regarding the state of charge of the batteries is provided with a display such as an LED display 28.

The example of FIG. 1 uses a microprocessor, but any suitable controller can be used. For example, dedicated digital logic can be used instead of programmable digital logic. Alternatively, analog circuit techniques can be used to implement the functions described below. Similarly, the display 28 can take any desired form, including any suitable visual display or auditory display, whether disposed physically close to the system 10 or physically remote from the system 10.

FIG. 3 illustrates a method implemented by the system of FIG. 1. In block 40, the system waits until the charging voltage generated by the alternator of FIG. 1 rises above a threshold. Once this is the case, the system opens all of the switches of the shunt paths in block 42 and then measures the voltage across each of the batteries in block 44. In block 46 the maximum measured voltage is determined, and in block 48 the shunt path switch that is associated with the maximum measured voltage is closed. The shunt path switch is held in the closed condition for two seconds (block 50), and then the LED display is updated in block 52. The cycle than repeats, and control is returned to block 40.

By way of example, the following conventions can be uses to present information regarding the state of charge of the batteries 18 and the operation of the system 10:

1. If the microprocessor 26 is not operating, the LED display 28 is dark.
2. If the charging voltage generated by the alternator 12 is less than 79 volts, a green LED is caused to blink once every six seconds. When the charging voltage is below 79 volts, the charge equalizer of FIG. 1 is in standby mode, and is not attempting to equalize charge among the batteries 18.
3. When the charge equalizer is working properly and the highest battery voltage is no more than 0.5 V greater than the lowest battery voltage in the string of six batteries, a green LED is caused to blink every two seconds.
4. In the event the largest battery voltage is more than 0.5 V and less than 1.0 V greater than the minimum measured battery voltage, a yellow LED is caused to blink in a sequence. The number of flashes in the sequence indicates the number of the battery in the string that has the highest battery voltage. For example, a yellow blinking LED flashing once per cycle indicates that the battery connected between ground and the second battery is the highest voltage battery in the string. The sequence is repeated twice, with a one second pause between the two sequences.
5. In the event that the highest battery voltage is more than one volt greater than the lowest battery voltage, a red LED is caused to blink. The same convention is used as with the blinking yellow LED to identify the battery having the highest battery voltage.
6. In the event the microprocessor 26 is not working properly due to faulty input voltages from the batteries, a red LED is caused to blink at a high rate. The microprocessor 26 must be connected at all times to the correct battery terminal sequence of the batteries 18, or this mode will persist.

As explained above, a charging current is applied to the string 16 of series—connected batteries 18 during blocks 42–52 of FIG. 3. This charging current is the result of the charging voltage applied across the string 16, and this charging voltage may be fixed or dynamically adjusted. In one embodiment, the charging voltage is adjusted as a function of the type of batteries 18 of the string 16, the temperature of one or more of the batteries 18 of the string 16, or some or all of the battery voltages measured in block 44.

The attached microfiche appendix provides complete details regarding the software and hardware of one implementation of the system 10.

The system and method described above identify the battery that has the highest voltage across its terminals, as compared to the other batteries in the string. The microprocessor closes the associated shunt path to bypass a fraction of the charge current through the shunt resistor around the highest voltage battery. This will lower the voltage across the highest voltage battery terminal pair, and it will increase the voltage across the remaining batteries in the string. Eventually, all of the batteries in the string will become evenly charged with substantially identical voltages across each battery terminal pair.

The method described above can be applied to any number of series-connected batteries. Preferably, the microprocessor 26, the shunt paths 20 and the LED display 28 are all housed inside an equalizer module.

The system described above has been found to equalize charging currents effectively when a string of batteries is being charged. After a short time (e.g. one-half hour) of operation, all batteries in the string generally attain an equalized charge state. In this way, the disclosed system prevents an over charge state from developing. This system also monitors this state of each battery in the string and provides information including fault codes to the charging system controller.

As used herein the tern "set" is used broadly to encompass two or more.

The term "battery" is used broadly to encompass a physically discrete battery or a cell within a battery.

The term "switch" is used broadly to encompass on/off switches as well as progressively controlled modulating switches.

The foregoing detailed description has discussed only a few of the many forms that this invention can take. For this reason, this detailed description is intended by way of illustration, not limitation. It is only the following claims, including all equivalents, that are intended to define the scope of this invention.

What is claimed is:

1. A method for equalizing charging of a set of series-connected batteries, said method comprising:
   (a) providing a plurality of shunt paths, each shunt path coupled across a respective one of the batteries;
   (b) repeatedly performing the following acts (b1)–(b3):
      (b1) measuring a plurality of voltages, each voltage indicative of a state of charge of a respective one of the batteries; then
      (b2) finding the largest voltage measured in (b1); then
      (b3) increasing shunt current through the shunt path associated with the largest voltage found in (b2).

2. A method for equalizing charging of a set of series-connected batteries, said method comprising:
   (a) providing a plurality of shunt paths, each shunt path coupled across a respective one of the batteries, each shunt path comprising at least one respective switch and at least one respective load;
   (b) repeatedly performing the following acts (b1)–(b4):
      (b1) measuring a plurality of voltages, each voltage indicative of a state of charge of a respective one of the batteries; then
      (b2) finding the largest voltage measured in (b1); then
      (b3) closing the switch of the shunt path associated with the largest voltage found in (b2); and then
      (b4) opening the switch closed in (b3).

3. The method of claim 1 wherein (b) further comprises the following act after (b3);
   (b1) reducing shunt current through the shunt path associated with the largest voltage found in (b2).

4. The method of claim 2 further comprising:
   waiting a selected time period after closing the switch in (b3) before opening the switch in (b4).

5. The method of claim 1 or 2 further comprising:
   opening all of the switches before (b1).

6. The method of claim 1 or 2 further comprising:
   (c) identifying with a display the battery associated with the highest measured voltage when the highest measured voltage of (b1) exceeds the lowest measured voltage of (b1) by more than a preset amount.

7. The method of claim 1 or 2 further comprising:
   (c) identifying with a display when all of the measured voltages of (b1) are equal to one another within a preset tolerance.

8. The method of claim 1 or 2 further comprising:
   (c) providing a charging current to the set of series-connected batteries during (b).

9. The method of claim 8 wherein (c) comprises:
   (c1) adjusting a charging voltage applied across the set of series-connected batteries as a function of at least one of the following parameters: type of batteries of the set, temperature of at least one of the batteries of the set, and at least one of the voltages measures in (b1).

* * * * *